(12) United States Patent
Leske et al.

(10) Patent No.: US 9,357,168 B1
(45) Date of Patent: May 31, 2016

(54) FACILITATING VIDEO CONFERENCES

(71) Applicant: Google Inc., Mountain View, CA (US)

(72) Inventors: Matthew John Leske, Stockholm (SE); Patrick Wynn, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/468,195

(22) Filed: Aug. 25, 2014

(51) Int. Cl.
*H04N 7/14* (2006.01)
*H04N 7/15* (2006.01)

(52) U.S. Cl.
CPC .................................... *H04N 7/15* (2013.01)

(58) Field of Classification Search
CPC ........................................................ H04N 7/14
USPC ................. 348/14.01, 14.07, 14.08, 14.12
See application file for complete search history.

(56) References Cited

U.S. PATENT DOCUMENTS

| | | | |
|---|---|---|---|
| 6,457,043 B1 | 9/2002 | Kwak et al. | |
| 7,768,543 B2 * | 8/2010 | Christiansen | H04L 29/06027 348/14.08 |
| 7,899,170 B2 | 3/2011 | Jeong et al. | |
| 8,280,083 B2 | 10/2012 | Pallone et al. | |
| 8,290,134 B2 | 10/2012 | Jaiswal et al. | |
| 8,411,130 B2 | 4/2013 | Lee et al. | |
| 8,422,406 B2 | 4/2013 | Ashbrook et al. | |
| 8,739,045 B2 | 5/2014 | Pang | |
| 8,890,926 B2 * | 11/2014 | Tandon et al. | 348/14.08 |
| 9,100,540 B1 * | 8/2015 | Gates | H04N 7/15 |
| 9,118,940 B2 * | 8/2015 | Valentine | H04N 7/152 |
| 2010/0157016 A1 * | 6/2010 | Sylvain | H04N 7/15 348/14.08 |
| 2012/0002001 A1 * | 1/2012 | Prentice | H04N 7/15 348/14.08 |
| 2014/0114664 A1 * | 4/2014 | Khan | H04N 7/152 704/270 |
| 2014/0354764 A1 * | 12/2014 | Avni | H04N 7/152 348/14.07 |

* cited by examiner

*Primary Examiner* — Olisa Anwah

(57) ABSTRACT

Implementations generally relate to facilitating video conferences. In some implementations, a method includes enabling a video conference having a plurality of participants. The method further includes determining one or more primary speakers from the participants. The method further includes modifying video streams of one or more participants based on the determining one or more of the participants as primary speakers.

18 Claims, 5 Drawing Sheets

FACILITATING VIDEO CONFERENCES

BACKGROUND

Video conferencing is often used in business settings and enables participants to share content with each other in real-time across geographically dispersed locations. A communication device at each location typically uses a video camera and microphone to send video and audio streams, and uses a video monitor and speaker to play received video and audio streams. The communication devices maintain a data linkage via a network and transmit video and audio streams in real-time across the network from one location to another.

SUMMARY

Implementations generally relate to facilitating video conferences. In some implementations, a method includes enabling a video conference having a plurality of participants. The method further includes determining one or more primary speakers from the participants. The method further includes modifying video streams of one or more participants based on the determining of one or more of the participants as primary speakers.

With further regard to the method, in some implementations, the determining of the one or more primary speakers is based on one or more predetermined attention factors. In some implementations, the determining of the one or more primary speakers is based on one or more predetermined attention factors, and where at least one predetermined attention factor is based on a proportion of speaking time. In some implementations, the determining of the one or more primary speakers is based on one or more predetermined attention factors, where at least one predetermined attention factor is based on a proportion of speaking time, and where the proportion of speaking time is based on a predetermined time period. In some implementations, the determining of the one or more primary speakers includes: determining attention values for the participants; and ranking the attention values. In some implementations, the modifying of the video streams includes changing one or more attributes of one or more video streams. In some implementations, the modifying of the video streams includes changing one or more attributes of one or more video streams, where at least one attribute is a position of a video stream. In some implementations, the modifying of the video streams includes changing one or more attributes of one or more video streams, where at least one attribute is a size of a video stream. In some implementations, the modifying of the video streams includes changing one or more attributes of one or more video streams, where at least one attribute is a saturation level of a video stream. In some implementations, the modifying of the video streams includes changing one or more attributes of one or more video streams, where at least one attribute is a brightness level of a video stream.

In some implementations, a method includes enabling a video conference having a plurality of participants. The method further includes determining one or more primary speakers from the participants, where the determining of the one or more primary speakers is based on one or more predetermined attention factors, and where at least one predetermined attention factor is based on a proportion of speaking time. The method further includes modifying video streams of one or more participants based on the determining of one or more of the participants as primary speakers, where the modifying of the video streams includes changing one or more attributes of one or more video streams, and where at least one attribute is one or more of a position of a video stream and a size of a video stream.

In some implementations, a system includes one or more processors, and logic encoded in one or more tangible media for execution by the one or more processors. When executed, the logic is operable to perform operations including: enabling a video conference having a plurality of participants; determining one or more primary speakers from the participants; and modifying video streams of one or more participants based on the determining of one or more of the participants as primary speakers.

With further regard to the system, in some implementations, the determining of the one or more primary speakers is based on one or more predetermined attention factors. In some implementations, the determining of the one or more primary speakers is based on one or more predetermined attention factors, and where at least one predetermined attention factor is based on a proportion of speaking time. In some implementations, the determining of the one or more primary speakers is based on one or more predetermined attention factors, and where at least one predetermined attention factor is based on a proportion of speaking time, and where the proportion of speaking time is based on a predetermined time period. In some implementations, to determine the one or more primary speakers, the logic when executed is further operable to perform operations including: determining attention values for the participants; and ranking the attention values. In some implementations, to modify the video streams, the logic when executed is further operable to perform operations including changing one or more attributes of one or more video streams. In some implementations, to modify the video streams, the logic when executed is further operable to perform operations including changing one or more attributes of one or more video streams, and where at least one attribute is a position of a video stream. In some implementations, to modify the video streams, the logic when executed is further operable to perform operations including changing one or more attributes of one or more video streams, and where at least one attribute is a size of a video stream. In some implementations, to modify the video streams, the logic when executed is further operable to perform operations including changing one or more attributes of one or more video streams, where at least one attribute is a saturation level of a video stream.

DETAILED DESCRIPTION

Implementations described herein facilitate video conferences. In various implementations, a system enables a video conference having a plurality of participants. The system then determines which of the participants are primary speakers at a given time. In some implementations, the system determines which participants are primary speakers based on one or more predetermined attention factors. In some implementations, at least one predetermined attention factor is based on a proportion of speaking time. For example, the system may consider a participant who is speaking 75% of the time as a primary speaker. As described in more detail below, in various implementations, the proportion of speaking time is based on a predetermined time period. For example, in various implementations, the predetermined time period may be 15 seconds, 30 seconds, 60 seconds, etc.

The system then modifies the video streams of one or more participants based on which of the participants are determined to be primary speakers. In some implementations, to modify video streams, the system may change one or more attributes of one or more video streams. The attributes may include one or more of the position of a given video stream, the size of a given video stream, the saturation level of a given video stream, and the brightness level of a given video stream.

Figure 1:
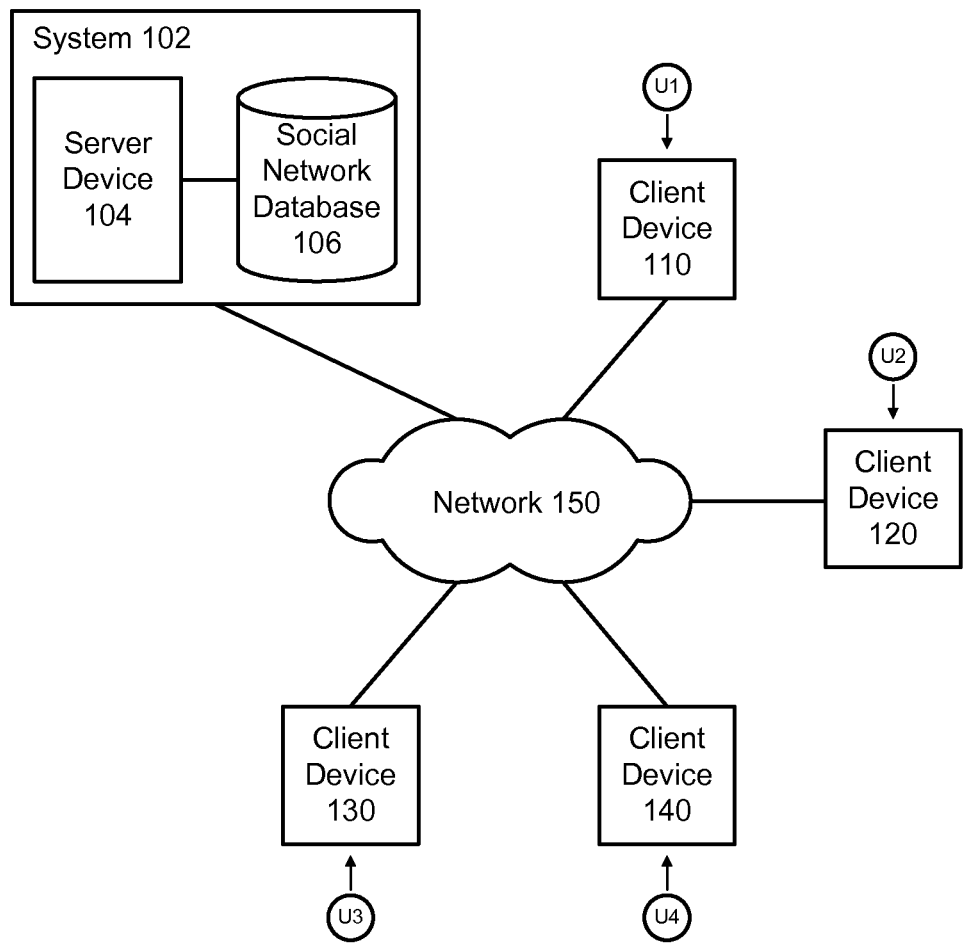
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In the various implementations described herein, the processor of system 102 causes the elements described herein (e.g., video streams, etc.) to be displayed in a user interface on one or more display screens.

Figure 2:
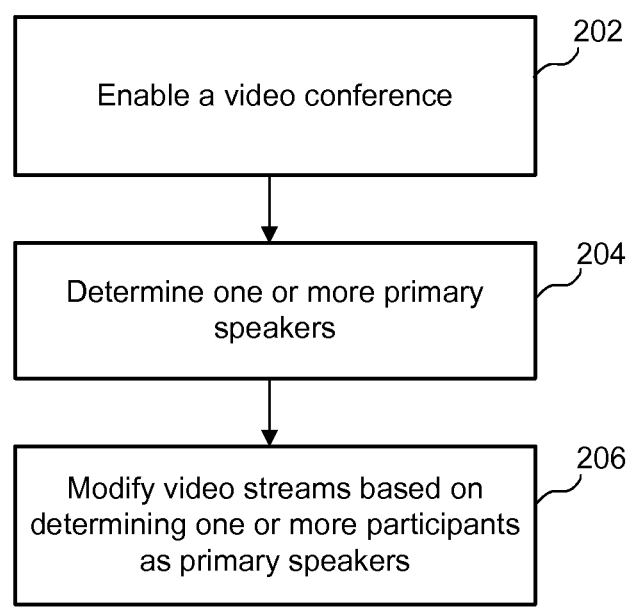
FIG. 2 illustrates an example simplified flow diagram for facilitating video conferences, according to some implementations.

FIG. 2 illustrates an example simplified flow diagram for facilitating video conferences, according to some implementations. Referring to both FIGS. 1 and 2, a method is initiated in block 202, where system 102 enables a video conference having a plurality of participants. An example implementation of a video conference is described in more detail below in connection with FIG. 3.

Figure 3:
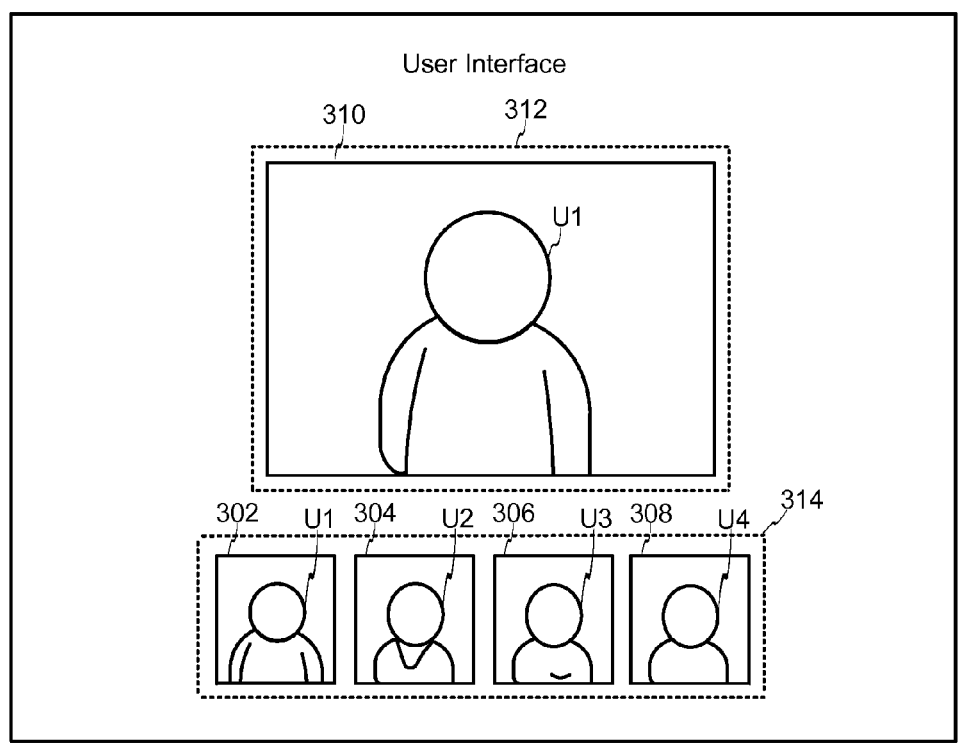
FIG. 3 illustrates an example simplified user interface, according to some implementations.

FIG. 3 illustrates an example simplified user interface 300, according to some implementations. In various implementations, user interface 300 includes multiple video windows 302, 304, 306, 308, and 310, which display video streams of respective users U1, U2, U3, and U4 who are participating in a multi-user video conference. For ease of illustration, four users U1, U2, U3, and U4 are shown. In various implementations, there may any number of users participating in the multi-user video conference (e.g., up to 10 users or more). In various implementations, system 102 enables users U1, U2, U3, and U4 to communicate by any combination of video, voice, audio, and typed chats.

In some implementations, user interface 300 includes a main video window 310, which corresponds to "current presenter position" 312. For ease of illustration, main video window 310 (solid-line box) is shown separately from and within current presenter position 312 (dotted-line box). In various implementations, main video window 310 and current presenter position 312 may directly overlap. In some implementations, the current presenter position 312 is a prominent position in user interface 300 that indicates that the user shown in that position is the "current presenter." In various implementations, the current presenter is the user who is communicating to the other users by voice. In this particular example, main video window 310 is displaying a video stream of user U1, who is the current presenter.

In some implementations, the video windows 302, 304, 306, and 308 correspond to "secondary presenter position" 314, and show all users including users who are not the current presenter. The series of video windows in secondary presenter position 314 may be referred to as a film strip, in that it shows thumbnails of all users U1, U2, U3, U4, etc. As shown, in some implementations, the current presenter (e.g., user U1) in the main video window 310 is also shown in one of the video windows (e.g., video window 302) in secondary presenter position 314. For ease of illustration, video windows 302, 304, 306, and 308 (solid-line boxes) are shown separately from each other and within secondary presenter position 314 (dotted-line box). In various implementations, each of the video windows 302, 304, 306, and 308 and a corresponding secondary presenter position 314 directly overlap. In some implementations, the secondary presenter position 314 is in a less prominent position in user interface 300. The second presenter position 314 indicates all users participating in the multi-user video conference, including the current presenter and the other users. In various implementations, the other users who are not the current presenter are users who are watching or listening to the current presenter. In this particular example, video windows 302, 304, 306, and 308 are displaying a video stream of all users U1, U2, U3, and U4. In some implementations, if the current presenter is shown in current presenter position 312, that current presenter is not also shown in secondary presenter position 314.

As shown, in this particular example, a video stream associated with a first user (e.g., user U1) is displayed in current presenter position 312, and a video stream associated with a second user (e.g., user U2) is displayed in secondary presenter position 314. Other aspects of user interface 300 are described in more detail below.

Referring still to FIG. 2, in block 204, system 102 determines one or more primary speakers from the participants. In various implementations, a primary speaker may also be referred to as a main speaker or a dominant speaker. As described in more detail below, in various implementations, system 102 determines the one or more primary speakers based on one or more predetermined attention factors.

While some implementations are described in the context of one primary speaker, implementations described here also apply to multiple primary speakers. Furthermore, as described in more detail below, the primary speaker or the set of primary speakers may change from moment to moment.

In some implementations, at least one predetermined attention factor is based on a proportion of speaking time. The proportion of speaking time may be the proportion of time that a given speaker speaks relative to one or more other participants. For example, the system may consider a participant as a primary speaker if that participant speaks 75% of the time, and the other participants together speak 25% of the time. In various implementations, a proportion of speaking time may be referred to as a duty cycle.

In some implementations, the proportion of speaking time may be based on a predetermined time period. For example, in various implementations, the predetermined time period may be 15 seconds, 30 seconds, 60 seconds, etc. These are only examples, and the particular predetermined time period will depend on the particular implementations. In some implementations, system 102 may determine a primary speaker based on the most recent predetermined time period (e.g., the most recent 30 seconds of the video conference).

In various implementations, system 102 determines the proportion of speaking time for each participant. System 102 may then assign an attention value, which may be proportional to the proportion of speaking time. For example, a speaker who speaks 75% of the time may receive a 0.75 attention value, whereas a speaker who speaks 10% of the time may receive a 0.1 attention value. This is an example, and the actual attention value units and/or numerical value may vary, depending on the particular implementation.

In some implementations, to determine the one or more primary speakers, system 102 determines attention values for the participants. System 102 then ranks the attention values in order to rank the participants. In some implementations, system 102 may determine the speaker with the highest ranking attention value to be the primary speaker.

In some implementations, system 102 may require a predetermined delta or difference between the highest ranking attention value and the second highest ranking attention value in order for there to be one primary speaker. In some scenarios, there may be no difference or little difference between the two highest ranking attention values. As such, there may be not be one, single primary speaker but two or even more primary speakers. This would be the case, for example, when during a given time period, two speakers among many participants are in a dialogue while the rest of the participants are primarily listening.

In some implementations, at least one predetermined attention factor may be based on a frequency of speaking time. For example, a given participant may function as a meeting chair or meeting moderator, where that participant may periodically and consistently interject comments and/or questions. As such, over the course of a longer predetermined time period (e.g., 1 minute, 5 minutes, 10 minutes, system 102 may give that speaker a higher attention value based frequency of speaking time. In various implementations, a given total attention value for a particular speaker may be based on a combination of predetermined attention factors (e.g., proportion of speaking time, frequency of speaking time, etc.).

In some implementations, system 102 may give more weight to some predetermined attention factors over others. For example, in some implementations, system 102 may give more weight to (e.g., a higher attention value) the proportion of speaking time over a shorter predetermined time period (e.g., 30 seconds, 60 seconds, etc.) than to a proportion of speaking time over a longer predetermined time period (e.g., 2 minutes, 5 minutes, etc.). This is because while some speakers may speak quite a bit over the course of the video conference, one or more particular speakers who are speaking at a given time for a particular time period (e.g., 30 seconds) should receive more focus while speaking in the video conference.

In another example implementation, system 102 may give the proportion of speaking time more weight compared to frequency of speaking time. This is because while some speakers may play a relatively important role (e.g., moderator), each participant should have the opportunity to receive more focus at given time while speaking in the video conference.

Referring still to FIG. 2, in block 206, system 102 modifies video streams of one or more participants based on the determining of one or more of the participants as primary speakers. In some implementations, to modify the video streams, system 102 may change one or more attributes of one or more video streams. In various implementations, system 102 may modify the video streams in a variety of ways. For example, in some implementations, at least one of the attributes may be the size of a video stream. In some implementations, at least one of the attributes may be the position of a video stream.

For ease of illustration, various implementations are described herein in the context of modifying the size and position associated with one or more video streams, however, these implementations and others also apply to other attributes. For example, as described in more detail below, system 102 may modify attributes such as saturation, brightness, etc. Furthermore, system 102 may modify a combination of these attributes for each of one or more video streams.

With regard to example attributes involving size and position, system 102 may visually enlarge the video stream output of the primary speaker relative to the other participants. System 102 may also visually position the video stream output of the primary speaker in a prominent position (e.g., centered in the user interface) relative to other participants. For example, referring again to FIG. 3, the primary speaker appears larger and is centered relative to the other participants in the user interface. Such modifications indicate the relevance or importance of the speaker at the time, where the importance is proportional to the relative amount that they are talking.

In various implementations, system 102 scales the attention or focus given to the primary speaker by allocating a greater number of pixels to the primary speaker. This makes the window for the video stream output bigger. In some implementations, system 102 may enlarge the window associated with the primary speaker, while leaving the windows associated with the remaining speakers the same size or even reducing their sizes in order to scale the attention for the primary speaker, and to perceptively fade the other participants into the background.

In various implementations, the degree of difference in the attributes between the primary speaker(s) and the remaining speakers may vary, and will depend on the particular implementations.

Figure 4:
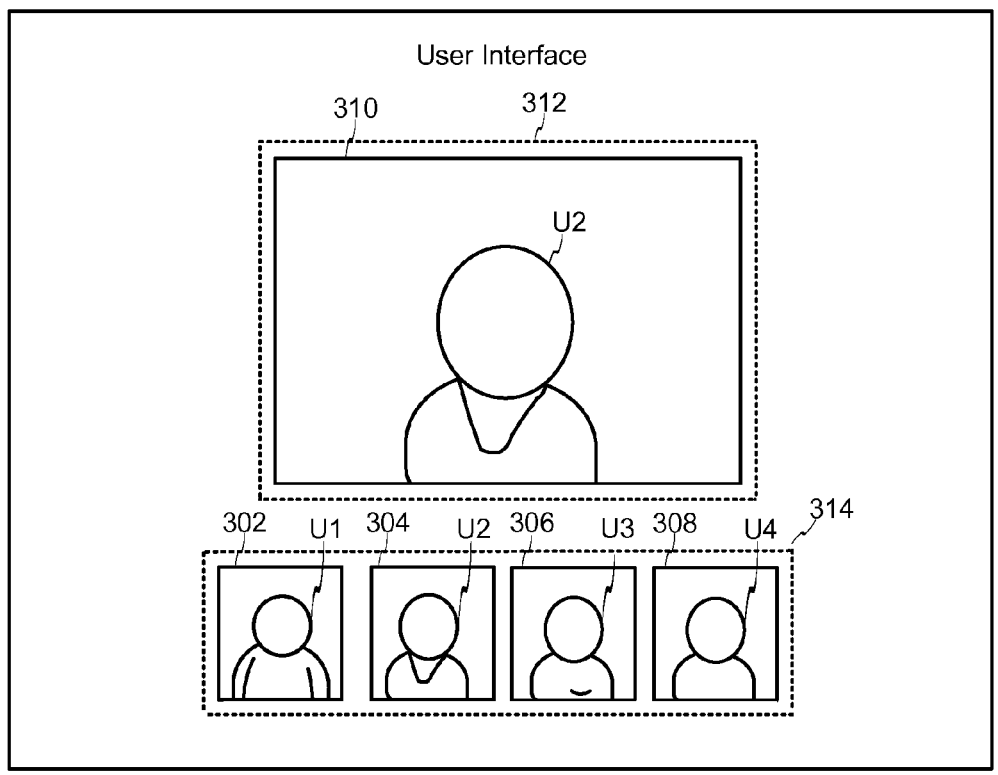
FIG. 4 illustrates the example user interface of FIG. 3 with a different primary speaker, according to some implementations.

FIG. 4 illustrates the example user interface of FIG. 3 with a different primary speaker, according to some implementations. As shown, user interface 300 includes the same elements as those of FIG. 3. The main difference between FIG. 3 and FIG. 4 is that FIG. 4 shows the video stream associated with the second user (e.g., user U2) being displayed in the current presenter position 312 and shows the video stream associated with the first user (e.g., user U1) being displayed in the secondary presenter position 314 and no longer in the current presenter position 312.

As indicated above, in various implementations, the primary speaker may change over time, depending on who is primarily speaking during a predetermined time period. In the example scenario shown in FIG. 3, user U1 is the primary speaker. In the example, scenario of FIG. 4, user U2 is the primary speaker.

As FIG. 4 shows, user U2 becomes the current presenter after system 102 determines user U2 to be the primary speaker, based on the attention values (e.g., the ranking of the attention values). As such, system 102 then causes user interface 300 to display the video stream associated with user U2 in current presenter position 310 and causes user interface 300 to display the video stream associated with user U1 in the secondary presenter position and no longer in current presenter position 310. For ease of illustration, some of these example implementations are described in the context of user U2 becoming the current presenter. In various implementations, other users such as user U3 or user U4, etc. may also become the current presenter.

In some implementations, user interface 300 displays the video stream associated with user U2 in the current presenter position 312 until system 102 detects a new participant to be the primary speaker.

For ease of illustration, user interface 300 shows one larger current presenter position 312 and smaller secondary presenter position 314, where the smaller windows in the secondary presenter position 314 are the same size. Other configurations are also possible. For example, in some implementations, for endpoints that have higher view rank values where users are not the current presenter, those users may be viewed in windows that are smaller than the window of the current presenter position 312, yet may be larger than the other windows in the secondary presenter positions.

As indicated herein, in many situations, there may be two or more dominant speakers. As such, system 102 changes attributes of the video stream window of each of the participants to reflect the primary speaker(s). For example, in some scenarios, system 102 may enlarge or otherwise change the video stream windows of two or more participants in order to indicate those participants as the primary speakers. Also, system 102 may display the two or more primary speakers side-by-side, leaving the remaining participants a smaller size and positioned toward the bottom of the user interface.

As indicated above, system 102 may modify various attributes in addition to size and position. For example, in some implementations, at least one attribute is a saturation level of the video stream. In some implementations, system 102 may change the color saturation of the video stream output for the primary speaker to full color, while reducing the color saturation for the video stream output of the other participants. In another implementation, system 102 may change the color saturation of the video stream output for the primary speaker to full color, while rendering video stream output of the other participants in black and white. The degree of difference in saturation level of the video stream output associated with the primary speaker and that of the other participants may vary, and will depend on the particular implementation.

In some implementations, at least one attribute is a brightness level of a video stream. For example, in some implementations, system 102 may brighten the video stream output for the primary speaker, while reducing the brightness/dimming, or even greying the video stream output for the other participants. The degree of difference in brightness level of the video stream output associated with the primary speaker and that of the other participants may vary, and will depend on the particular implementation.

Implementations described herein provide various benefits. For example, implementations described herein increase overall engagement among users in a social networking environment. Implementations enable video conferences to more closely emulate real, physical conferences with primary and secondary speakers and participants who primarily listen as an audience.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 5:
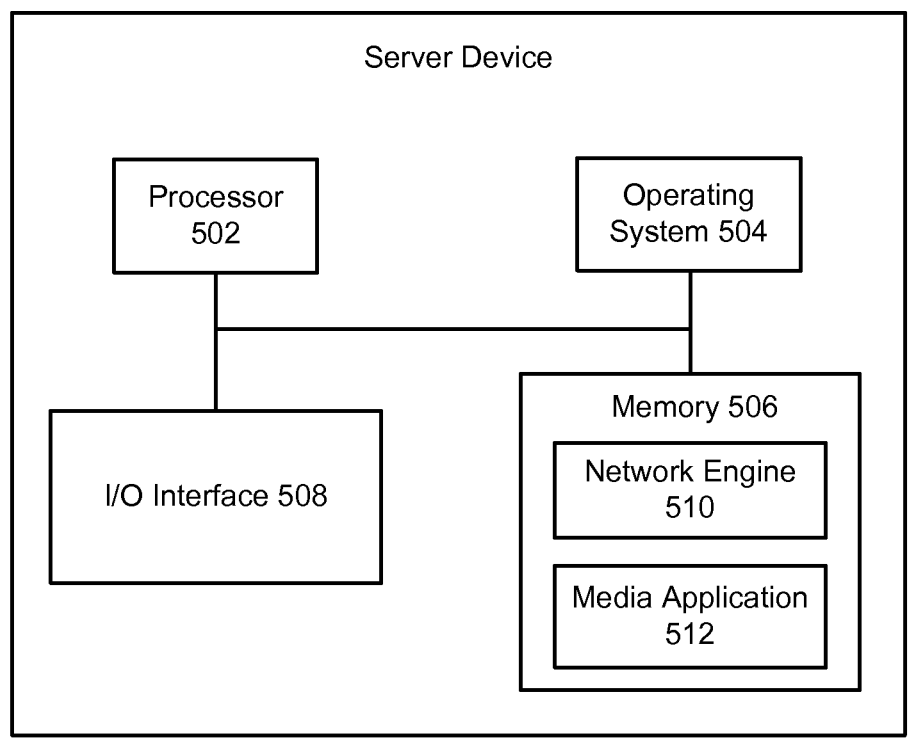
FIG. 5 illustrates a block diagram of an example server device, which may be used to implement the implementations described herein.

FIG. 5 illustrates a block diagram of an example server device 500, which may be used to implement the implementations described herein. For example, server device 500 may be used to implement server device 104 of FIG. 1, as well as to perform the method implementations described herein. In some implementations, server device 500 includes a processor 502, an operating system 504, a memory 506, and an input/output (I/O) interface 508. Server device 500 also includes a network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, network engine 510, and media application 512. These blocks 502, 504, 506, 508, 510, and 512 may represent multiple processors, operating systems, memories, I/O interfaces, network engines, and media applications. In other implementations, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. For example, a tangible medium such as a hardware storage device can be used to store the control logic, which can include executable instructions. The software instructions can also be contained in, and provided as, an electronic signal, for example in the form of software as a service (SaaS) delivered from a server (e.g., a distributed system and/or a cloud computing system).

What is claimed is:

1. A non-transitory computer readable storage medium including instructions that, when executed by a processor, cause the processor to perform a method comprising:
    enabling a video conference having a plurality of participants;
    determining an attention value for each of the plurality of participants, the attention value indicating a proportion of speaking time of each respective participant;
    determining at least two highest ranking attention values for at least two of the plurality of participants;
    determining one or more primary speakers from the plurality of participants based on a difference between the two highest ranking attention values meets a threshold difference; and
    modifying video streams of one or more of the plurality of participants based on determining the one or more primary speakers, wherein modifying the video streams comprises changing one or more of a position of at least one of the video streams and a size of at least one of the video streams.

2. A computer-implemented method comprising:
    providing a video conference having a plurality of participants;
    determining an attention value for each of the plurality of participants, the attention value indicating a proportion of speaking time of each respective participant;
    determining at least two highest ranking attention values for at least two of the plurality of participants;
    determining one or more primary speakers from the plurality of participants based on a threshold difference between the at least two highest ranking attention values; and
    modifying video streams of one or more of the plurality of participants based on determining the one or more primary speakers.

3. The method of claim 2, wherein the proportion of speaking time is based on a predetermined time period.

4. The method of claim 2, wherein the determining of the one or more primary speakers comprises:
    ranking the attention values.

5. The method of claim 2, wherein modifying the video streams comprises allocating a greater number of pixels to the video stream of the one or more primary speakers and a fewer number of pixels to a remainder of the video streams.

6. The method of claim 2, wherein modifying the video streams comprises changing one or more attributes of one or more of the video streams, wherein at least one attribute is a position of a video stream.

7. The method of claim 2, wherein modifying the video streams comprises changing one or more attributes of one or more of the video streams, wherein at least one attribute is a size of a video stream.

8. The method of claim 2, wherein modifying the video streams comprises changing one or more attributes of one or more of the video streams, wherein at least one attribute is a saturation level of a video stream.

9. The method of claim 2, wherein modifying the video streams comprises changing one or more attributes of one or more of the video streams, wherein at least one attribute is a brightness level of a video stream.

10. A system comprising:
    one or more processors; and
    logic encoded in one or more tangible media for execution by the one or more processors and when executed operable to perform operations comprising:
    providing a video conference having a plurality of participants;
    determining an attention value for each of the plurality of participants, the attention value indicating a proportion of speaking time of each respective participant;
    determining at least two highest ranking attention values for at least two of the plurality of participants;
    determining one or more primary speakers from the plurality of participants based on a threshold difference between the at least two highest ranking attention values; and
    modifying video streams of one or more of the plurality of participants based on determining the one or more primary speakers.

11. The system of claim 10, wherein the proportion of speaking time is based on a predetermined time period.

12. The system of claim 10, wherein, to determine the one or more primary speakers, the logic when executed is further operable to perform operations comprising:
    ranking the attention values.

13. The system of claim 10, wherein, to modify the video streams, the logic when executed is further operable to perform operations comprising allocating a greater number of pixels to the video stream of the one or more primary speakers and a fewer number of pixels to a remainder of the video streams.

14. The system of claim 10, wherein, to modify the video streams, the logic when executed is further operable to perform operations comprising changing one or more attributes of the video streams, and wherein at least one attribute is a position of a video stream.

15. The system of claim 10, wherein, to modify the video streams, the logic when executed is further operable to perform operations comprising changing one or more attributes of the video streams, and wherein at least one attribute is a size of a video stream.

16. The system of claim 10, wherein, to modify the video streams, the logic when executed is further operable to perform operations comprising changing one or more attributes of the video streams, and wherein at least one attribute is a saturation level of a video stream.

17. The method of claim 2, wherein at least two primary speakers are determined and wherein a difference between the at least two highest ranking attention values is below the threshold difference.

18. The system of claim 10, wherein at least two primary speakers are determined and wherein a difference between the at least two highest ranking attention values is below the threshold difference.

\* \* \* \* \*